Oct. 13, 1931.  H. F. HITNER  1,827,471
APPARATUS FOR MAKING GLASS
Filed Dec. 22, 1928  3 Sheets-Sheet 2

INVENTOR
Harry F. Hitner

Oct. 13, 1931.  H. F. HITNER  1,827,471
APPARATUS FOR MAKING GLASS
Filed Dec. 22, 1928  3 Sheets-Sheet 3
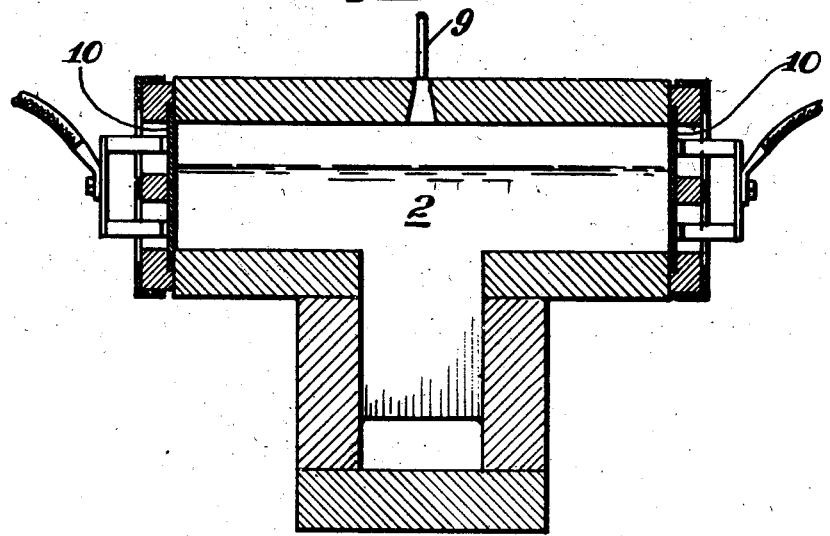
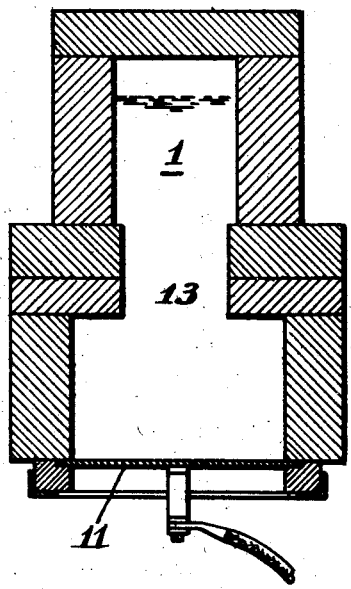
INVENTOR
Harry F. Hitner
by James C. Bradley
atty.

UNITED STATES PATENT OFFICE

HARRY F. HITNER, OF OAKMONT, PENNSYLVANIA, ASSIGNOR TO PITTSBURGH PLATE GLASS COMPANY, A CORPORATION OF PENNSYLVANIA

APPARATUS FOR MAKING GLASS

Application filed December 22, 1928. Serial No. 327,997.

Figure 2:
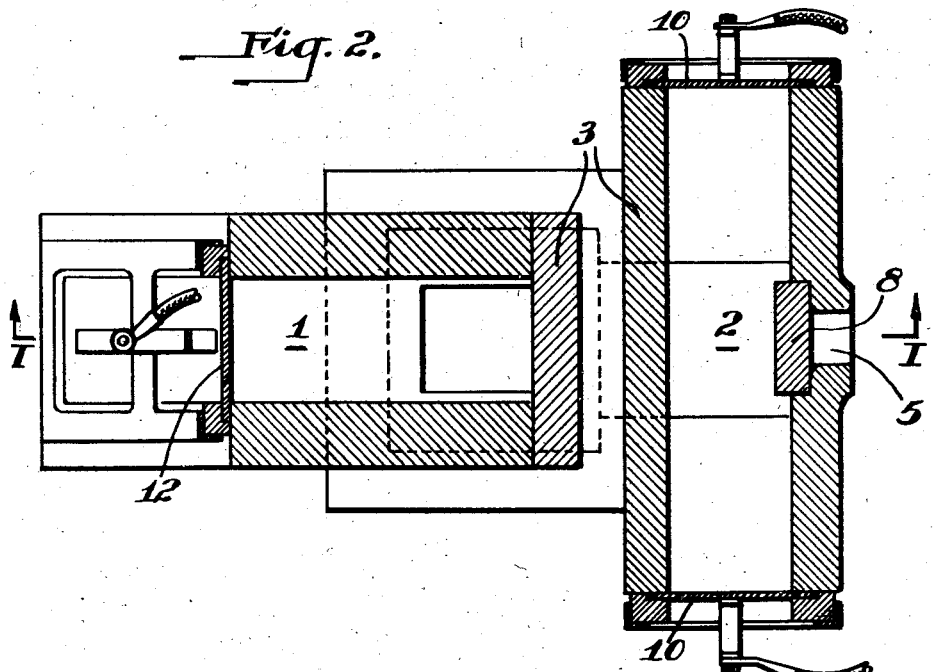
Figure 1:
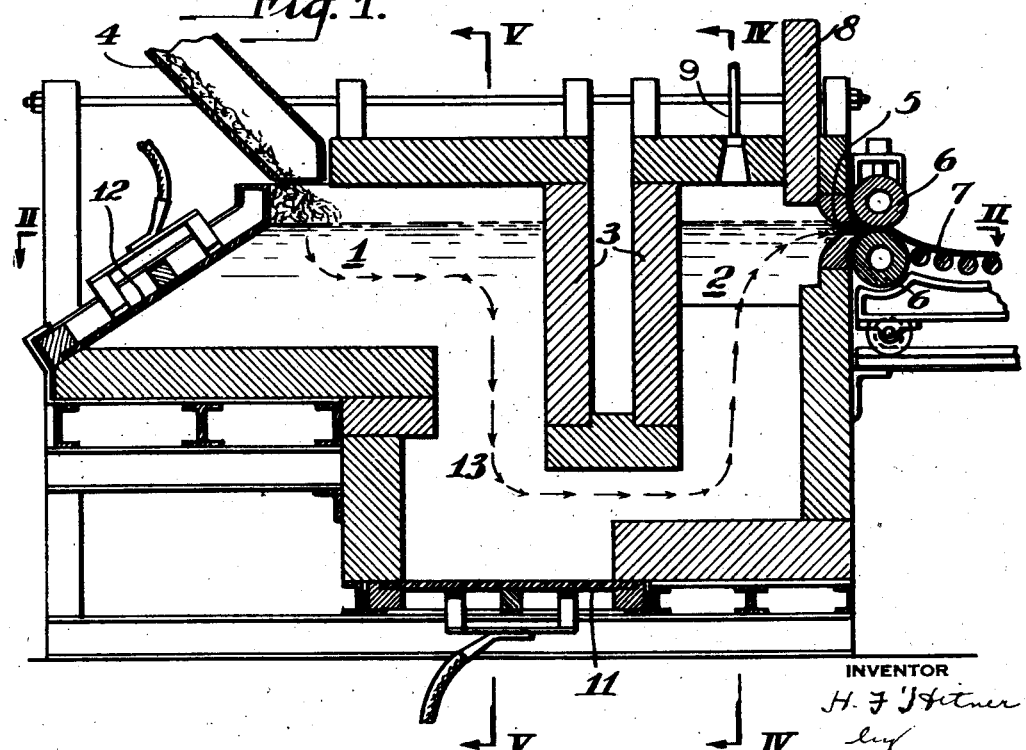
Figure 3:
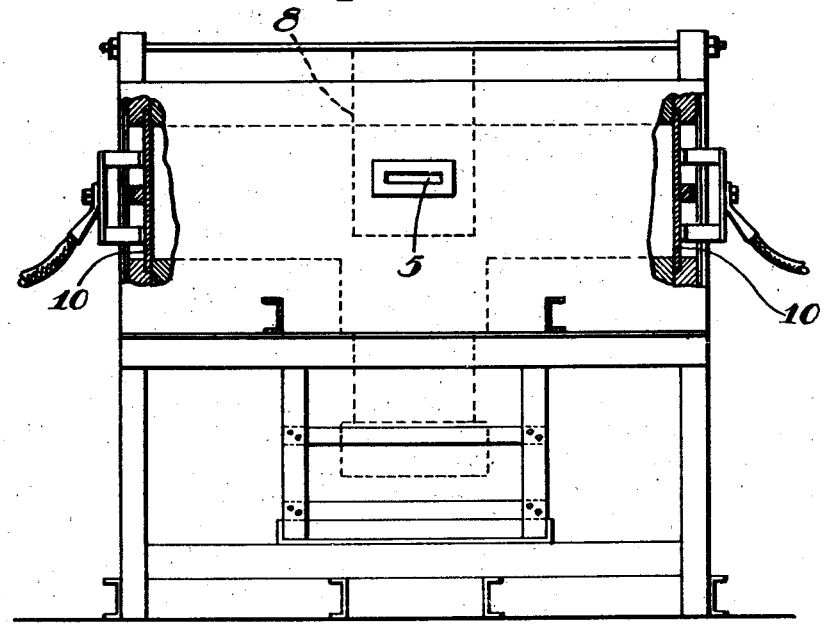
Figure 6:
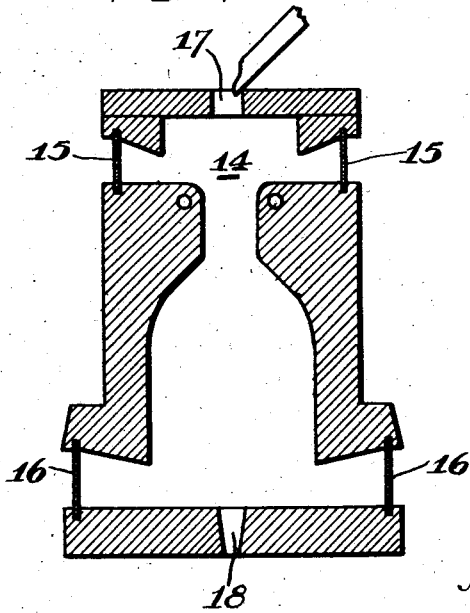

The invention relates to apparatus for making glass and the like by the use of electricity as a melting and fining agent, and involves certain improvements over the apparatus shown and described in my application, Serial No. 193,404. The invention has for one of its principal objects, the provision of an improved arrangement of electrodes whereby convection currents in the glass are reduced to a minimum, which reduction in convection currents results in increased efficiency, improved quality of glass, and decreased corrosion of the walls of the tank. A further object is the provision of an improved form of electrode arranged so that the glass is heated to the greatest extent adjacent the surface of the glass, this being particularly desirable where the batch is introduced next to the electrode so that additional heat is required at this point. Certain embodiments of the invention are illustrated in the accompanying drawings, wherein:

Figure 1 is a section through the furnace on the line I—I of Fig. 2. Fig. 2 is a section on the line II—II of Fig. 1. Fig. 3 is an end elevation partly in section of the furnace with the rolls removed. Figs. 4 and 5 are vertical sections on the lines IV—IV and V—V, respectively of Fig. 1. And Fig. 6 is a vertical section through a modification.

Referring to the drawings, 1 is the melting end of the tank, and 2 is the refining end, such ends being separated by the double wall 3 extending down into the tank to a point adjacent the bottom. Batch is supplied to the melting end through the chute 4, and the molten glass is withdrawn from the refining end through the outlet 5, past the driven cooled rolls 6, 6 which form the glass into the sheet 7. The method shown of withdrawing and utilizing the glass forms no part of the present invention and the invention contemplates any and all methods of withdrawing and utilizing the glass after it is melted and refined. A cut off gate 8 is shown for stopping the flow of glass when desired. The glass in the refining end 2 of the furnace may be kept hot by gas burners, such as the burner 9 shown in Fig. 1 or by the use of electric current supplied to the metal electrode plates 10, 10 (Fig. 2), such plates being of any suitable material having the requisite degree of refractoriness and conductivity; such as, chromium iron alloy containing about 25 per cent of chromium.

The melting of the glass is accomplished by means of electric current supplied to the metal electrode plates 11 and 12, of a composition similar to that of the plates 10, 10, single phase alternating current being preferably employed. The plate 11 preferably constitutes a part of the bottom wall of the furnace and is located at the outlet of the melting end of the furnace, while the plate 12 constitutes a part of the side wall of the furnace and is located so that its upper end lies in close proximity to the batch which is being fed into the furnace. The plate 12 is preferably inclined downwardly from the surface of the glass and to the rear as shown, as this gives a better heating condition than where a vertical plate is used. With a vertical plate there is a tendency to over-heat the plate at a point substantially below the surface of the glass, the upper portion of the plate being cooled by the action of the incoming batch. By using the inclined plate, this condition is modified, as the current has a shorter path to travel between the plate 11 and the upper edge of the plate 12 than between such plate 11 and the lower portion of the plate 12. The resistance being less for the shorter path, the current flow through such shorter path will be greater and the heating effect greater. The lower portion of the plate can thus be prevented from overheating, and a higher heat secured at the surface of the glass where it is required in order to give a rapid fusing of the batch floating at the surface of the molten bath.

The arrangement of the two electrodes as shown with one adjacent the upper level of the tank and the other at the extreme bottom or near it has also been found to give improved results, as compared with those heretofore proposed with the electrode plates in the side walls of the furnace at the same level. The vertical flow of the current and of the glass itself in passing through the well 13 (Fig. 1), forming a part of the melting end of the furnace, largely eliminates the convection currents heretofore encountered in glass furnaces of this general type. The elimination of these currents increases the efficiency of the furnace, reduces the corrosion of the furnace walls, and results in an improved quality of glass. The reduced horizontal cross section of the well intermediate its ends (providing in effect a neck) has also been found of advantage in permitting the separation of fully melted glass from glass which is only partially melted or reduced. The intense heat at the reduced portion or neck causes a boiling action in the glass, due to the liberation of gases, and the lighter, partially melted glass or batch, is carried upward, while the completely melted heavier glass settles into the large portion of the well beneath the neck. In operation, the flow of glass follows the path indicated by the arrows in Fig. 1.

The construction shown in Fig. 6 involves a modification employing the same principle of vertical flow, the well 14 lying in the line of current flow between the electrode plates 15, 15 lying adjacent the upper level of the tank and the electrode plates 16, 16 lying adjacent the bottom of the well. Batch is introduced at the top of the tank through the opening 17, while the molten glass is withdrawn through the outlet 18 in the bottom wall of the tank, no means being shown in this instance for utilizing the glass.

The tank and associated apparatus is suitable for the reduction of vitreous products other than those commonly referred to as glass, such as the vitreous enamels, which are a species of glass, and silicate of soda, which is sometimes referred to as soluble glass. It will be understood, therefore, that the term "glass" is used in its broad sense and that the furnace is not limited to use in the melting of the ordinary forms of glass.

What I claim is:

1. In combination in apparatus for making glass, a tank having a melting end and a refining end with an interposed wall extending down into the glass so that the two ends communicate beneath the lower edge of such wall, an outlet for withdrawing molten glass from the refining end of the tank, means for supplying batch to the melting end of the furnace, a metal electrode plate forming a part of the side wall of the tank adjacent the point where batch is supplied and extending in an inclined position downwardly and to the rear from the surface of the glass, a second metal electrode plate forming a part of the bottom wall of the furnace at the outlet of the melting end of the furnace, and means for supplying current to the electrodes.

2. In combination in apparatus for making glass, a tank having electrode members constituting a part of the walls of the tank at points remote from each other, one of said members having its surface which contacts with the glass extending downward from the surface thereof and inclined away from the other electrode, and means for supplying batch to the tank adjacent the upper end of the inclined electrode.

3. In combination in apparatus for making glass, a tank having electrode members constituting a part of the walls of the tank at points remote from each other, one of said members having its surface which contacts with the glass extending downward from the surface thereof and inclined away from the other electrode, and means for cooling the upper end of said inclined electrode.

4. In glass making apparatus, a tank wherein molten glass acts as a resistance to a current of electricity having a well provided with a neck therein of reduced horizontal cross section as compared with the horizontal cross section of the well above and below said neck, electrodes for supplying current to the glass in the tank above and below said neck, so that there is a flow of current through the neck, means for supplying batch to the upper portion of the well, and an outlet from the lower portion of the tank below said neck, the lower one of said electrodes comprising a metal plate lying in opposition to the end of the well and constituting a part of the bottom wall of the tank.

5. In combination in apparatus for making glass wherein molten glass acts as a resistance to a current of electricity, a tank, electrodes in said tank comprising a part of the walls thereof and having a relatively large surface, as compared with the thickness of said electrode, contacting with the glass in the tank, at least one of said electrodes being inclined toward the other, so that the path through which current flows between the electrodes is shorter between a part of one electrode and a part of another electrode than other parts, thereby concentrating current in predetermined portions of the glass.

6. In combination in apparatus for making glass, a tank comprising a melting portion and a refining portion, an electrode at each end of said melting portion, one of said electrodes being spaced vertically above the other, said upper electrode being located at a substantial angle to the horizontal, and said lower electrode being located substantially horizontally, means for passing a current of electricity between said electrodes, whereby the current density on certain portions of said upper electrode is greater than on other portions thereof, and means for cooling the portion of said upper electrode adjacent the area of greatest current density.

7. In combination in apparatus for making glass, a tank comprising a melting portion and a refining portion, an electrode at each end of said melting portion, one of said electrodes being spaced vertically above the other, means for passing a current of electricity between said electrodes in such a manner that the density of current on certain portions of the upper electrode will be greater than other portions thereof and of the lower electrode, and means for cooling said upper electrode adjacent the point of greatest current density by supplying batch adjacent thereto.

8. In glass making apparatus, a tank wherein molten glass acts as a resistance to a current of electricity, an electrode in said tank in contact with the glass therein, a second electrode in contact with the glass spaced below said first electrode, and a neck between said electrodes having its smallest cross-sectional area less than the glass contacting area of either of said electrodes, and means for causing a flow of electric current from one electrode to the other through said neck so as to give a maximum heating effect to the glass in said neck.

9. In combination in a glass making tank having a vertical well with a neck therein of reduced horizontal cross section as compared with its cross section above and below said neck, an electrode above said well, a second electrode below said well, means for causing a flow of electricity between said electrodes through said neck, and means for causing a normal flow of glass downwardly through said neck.

10. A glass making furnace in which glass is made by passing a current of electricity through glass forming materials and in which the glass itself serves as a resistance to the current, comprising a melting section and a refining section, said melting section having a batch receiving portion and a settling portion vertically spaced from each other, a neck section interposed between said receiving and settling portions, said neck portion being of lesser horizontal cross sectional area than either said batch receiving portion or said settling portion, means for causing a flow of electric current from one electrode to the other through said neck so as to give a maximum heating effect to the glass in said neck, and means for withdrawing glass from said settling portion.

11. In combination in a tank for forming substances which are conductors at high temperatures but the batch of which is substantially dielectric at temperatures less than the point of fusion of the batch, a vertical well with a neck therein of reduced horizontal cross section as compared with its cross section above and below said neck, an electrode above said neck for supplying current to said substances, a second electrode spaced below said first electrode and below said neck to cause a flow of current through said neck, means for supplying batch to the upper portion of said well, and an outlet from the portion of the tank below said neck.

12. In combination in an electric furnace for making glass, a tank comprising a pair of chambers arranged one above the other with a connecting vertical neck of a horizontal cross section less than that of the chambers, electrodes for supplying current to the glass in the tank above and below said neck so that there is a flow of current therethrough, and means for supplying batch to the upper one of said chambers, said lower chamber being provided with an outlet for withdrawing the molten glass.

13. In combination in an electric furnace for making glass, a tank comprising a pair of chambers arranged one above the other with a connecting vertical neck of a horizontal cross section less than that of the chambers, a plate electrode contacting with the glass in the lower chamber, a second electrode in the upper chamber, means for supplying current to the electrodes to cause a flow of such current through the glass in the tank, means for withdrawing the melted glass from the lower chamber, and means for supplying batch to the upper one of said chambers.

In testimony whereof, I have hereunto subscribed my name this 21st day of December, 1928.

HARRY F. HITNER.